D. L. SHEAFOR.
VALVE.
APPLICATION FILED JAN. 29, 1920.
1,381,938.
Patented June 21, 1921.
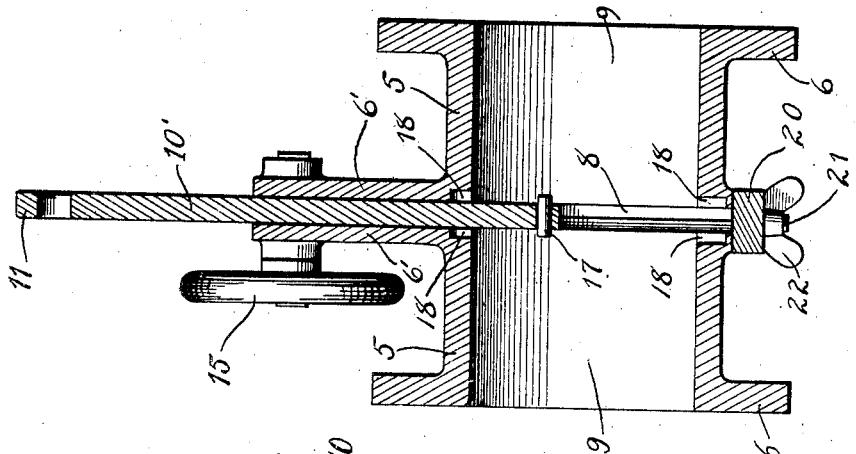
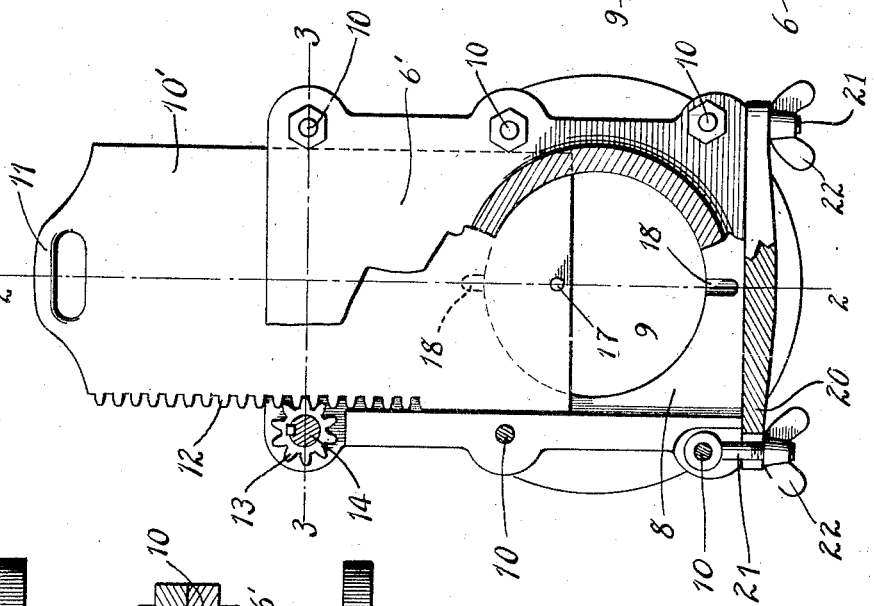
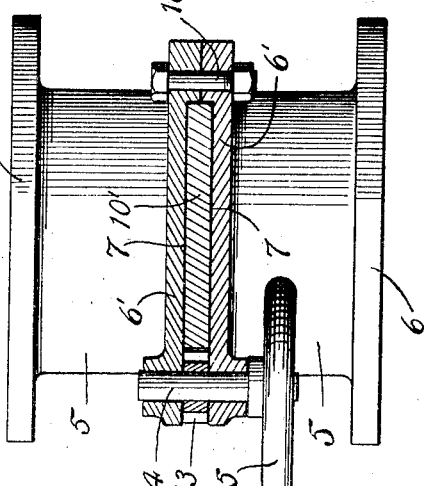
Inventor
Dee L. Sheafor
By Williams, Bradbury & See
Attorney

UNITED STATES PATENT OFFICE.

DEE L. SHEAFOR, OF CHICAGO, ILLINOIS, ASSIGNOR, BY MESNE ASSIGNMENTS, OF ONE-HALF TO HOMER D. MARTINDALE, OF MIDDLETOWN, OHIO.

VALVE.

1,381,938.         Specification of Letters Patent.     Patented June 21, 1921.

Application filed January 29, 1920. Serial No. 355,007.

*To all whom it may concern:*

Be it known that I, DEE L. SHEAFOR, a citizen of the United States, residing at Chicago, in the county of Cook and State of Illinois, have invented a certain new and useful Improvement in Valves, of which the following is a full, clear, concise, and exact description, reference being had to the accompanying drawings, forming a part of this specification.

My invention relates to improvements in valves and is especially concerned with the provision of a novel valve to be used in pipe lines for conveying or conducting paper stock or other fibrous materials held in suspension in water or other fluids.

The objects of my invention are—

First: to provide a valve for the purposes set forth, of such construction that it will not become clogged by lodgment therein of pieces of wood, rags, pencils, pins, nails and other foreign matter usually found in paper stock.

Second: to provide a valve which will not stick after having set in one position for a considerable length of time.

Third: to provide a valve which can be easily operated to open and close the same.

Fourth: to provide a valve in which paper fibers, themselves, form a seal for preventing water from leaking from said valve.

Fifth: to provide a valve comprising means for preventing the theft of the valve gate, and Sixth: to provide a valve of the type described above which can be economically manufactured.

Other objects will appear as this description progresses, reference being had to the accompanying drawings, in which—

Figure 1 is an end elevation of my improved valve, portions thereof being broken away for the purpose of better illustration.

Fig. 2 is a vertical longitudinal section taken on line 2—2 of Fig. 1, and

Fig. 3 is a horizontal section taken on line 3—3 of Fig. 1.

Throughout the several views similar reference characters will be used for referring to similar parts.

Referring to the drawings, the body of my improved valve comprises the two body portions 5, having the bolting flanges 6. The adjacent ends of the body portions 5 are each provided with a transversely extending lug 6'. The adjacent ends of the body portions 5 are likewise provided with grooves 7 extending entirely thereacross and co-acting to form a gate guideway 8 of slightly greater width than the registering passageways 9 of the body portions. I clamp the adjacent ends of the body portions 5 together by means of bolts 10 passing therethrough as shown in Figs. 1 and 3. Slidably mounted in the guideway 8 is a gate 10' provided at its upper end with a hand grip 11 by means of which it can ordinarily be either opened or closed. If the gate 10' should happen to have remained in a given position for some considerable length of time, it may not be easy to operate it by means of a hand grip and I therefore provide means whereby it can be easily operated. This means comprises a gear rack 12 formed in one edge of the gate 10' and a pinion 13 which is keyed to a shaft 14, journaled in the lugs 6 as shown in Figs. 1 and 3. One end of the shaft 14 is provided with a hand wheel 15 by means of which it can easily be operated.

At the present time valves are used in pipe lines for conveying paper stock which comprise a cast iron body and a cast iron gate. Such valves after remaining in a given position for any length of time become practically impossible to operate by reason of the corroding action of the stock upon the relatively movable parts of the valve. I have discovered that if one of the relatively movable portions of the valve, that is, either the gate or the body portion be made of bronze or brass, or other similar material, there is no tendency for these parts to corrode and consequently where it has heretofore been necessary, with the types of valves at present in use, to dismantle a pipe line in the event it became necessary to close a valve after it had remained in an open position for any considerable length of time, it is now possible, by the use of my improved valve, to easily operate the valve, irrespective of the length of time it has remained in any given position.

On account of the relative masses of the two parts, it is cheaper to construct the gate of bronze or brass than it is to construct the body of this valve of one of these materials; consequently I prefer to make the gate of either bronze or brass rather than the body of the valve.

As stated above, I prefer to make the gates 11 of bronze or brass and experience has demonstrated that some employees of paper mills become so attached to these gates that they do not hesitate to appropriate them for their own use and to their financial advantage. To prevent this unauthorized appropriation of the gates, I provide the inner end of each gate with a pin 17, which extends from both sides of the gate and prevents the removal of the gate, without completely removing the valve from the pipe line and dismantling it. In order to permit the gate to be completely opened or completely closed, I provide recesses 18 on opposite sides of the passageways of the body portions to receive the ends of the pins 17 in either its open or closed position.

Much trouble has heretofore been experienced in valves of the type now employed in pipe lines for conveying paper stock by reason of foreign articles and even the paper fiber itself becoming lodged in the guideway for the gate thus necessitating complete dismantling of the pipe line and the valve itself to remove these obstructions. To overcome these objections, to prior constructions, I have, as stated above, formed the guideway for the gate so that it extends completely through the valve body as shown in Figs. 1 and 2. A cap or closure 20 is arranged to close the lower end of the guideway 8 and is secured to the valve by means of eye bolts 21 pivoted upon the bolts 10 and thumb nuts 22.

It will be noticed that my valve does not include any bushings, packings or other similar expedients for preventing leakage of water through the valve. The reason for this is that as soon as a valve constructed in accordance with my invention is placed in operation there will be a slight seepage of water therethrough, but the flow of this water carries paper fiber in between the parts of the valve and completely seals the valve so that there is no further leakage. Paper fiber will gather in the lower part of the guideway 8 and form a seal for the joint between the valve body and the closure 20. After repeatedly opening and closing the valve, paper fiber may gather in the lower portion of the guideway 8 to such an extent as to interfere with the complete closing of the gate 10' or it sometimes happens that a foreign object drops into this guideway. In either event, the fiber or foreign object can be easily and quickly removed by merely actuating the guide 10' to as near its closed position as is possible, then removing the closure 20 and thereupon actuating the gate 10' to expel the fiber or the foreign object from the guideway 8. The closure is then replaced and the valve opened as before.

While I have described the details of the preferred embodiment of my invention, it is to be clearly understood that my invention is not limited to these details, but is capable of other adaptations and modifications within the scope of the appended claims.

Having thus described my invention, what I claim is:

1. A valve comprising two body portions having registering passageways, the adjacent end of said body portions each comprising a transversely extending lug and each being provided with a groove extending entirely thereacross, the two grooves co-acting to form a gate guideway opening on opposite sides of said valve, a gate slidable in said guideway, one side of said gate being provided with a rack, a pinion rotatably supported between said lugs, means for rotating said pinion, a pin on the inner end of said gate for preventing it from being entirely withdrawn from said valve, recesses on opposite sides of said valve for receiving said pin, and a cover plate, removably secured to the side of said valve opposite said lugs, for closing one end of said guideway.

2. A valve comprising two body portions having registering passageways, the adjacent end of said body portions each comprising a transversely extending lug and each being provided with a groove extending entirely thereacross, the two grooves co-acting to form a gate guideway opening on opposite sides of said valve, a gate slidable in said guideway, one side of said gate being provided with a rack, a pinion rotatably supported between said lugs, means for rotating said pinion, means on the inner end of said gate for preventing it from being withdrawn from said valve, and a cover plate, removably secured to the side of said valve opposite said lugs, for closing one end of said guideway.

3. A valve comprising two body portions having registering passageways, the adjacent end of said body portions each comprising a transversely extending lug and each being provided with a groove extending entirely thereacross, the two grooves co-acting to form a gate guideway opening on opposite sides of said valve, a gate slidable in said guideway, means on the inner end of said gate for preventing it from being withdrawn from said valve, and a cover plate, removably secured to the side of said valve opposite said lugs, for closing one end of said guideway.

4. A valve comprising a body, a gate slidable therein and means on the inner end of said gate for preventing said gate from being entirely withdrawn from said body.

5. A valve comprising a body having a passageway therein, a guideway provided in said body extending transversely of said passageway, and entirely through said body, a gate slidable in said guideway, said gate being wider than said passageway, a removable closure for one end of said guideway, means for operating said gate comprising a hand-grip on said gate projecting permanently from said guideway opposite said closure, a rack formed on one side of said gate, a pinion rotatably mounted in said body meshing with said rack, and means for rotating said pinion, and means on said gate for preventing it from being withdrawn from said valve.

6. A valve comprising a body having a passageway therein, a guideway provided in said body extending transversely of said passageway, a gate slidable in said guideway, means for operating said gate comprising a hand-grip on said gate projecting permanently from said guideway, a rack formed on one side of said gate, a pinion rotatably mounted in said body meshing with said rack, and means for rotating said pinion, and means on said gate for preventing it from being withdrawn from said valve.

7. A valve comprising a body having a passageway therein, a guideway provided in said body extending transversely of said passageway, a gate slidable in said guideway, means for operating said gate comprising a hand-grip on said gate projecting permanently from said guideway, and means on said gate for preventing it from being withdrawn from said valve.

In witness whereof, I hereunto subscribe my name this 17th day of January, 1920.

DEE L. SHEAFOR.

Witnesses:
EARL F. PIERCE,
MARY A. COOK.